United States Patent
Cross et al.

(10) Patent No.: US 11,251,716 B2
(45) Date of Patent: Feb. 15, 2022

(54) ELECTRICITY DISTRIBUTION NETWORKS

(71) Applicants: TURBO POWER SYSTEMS LTD, Gateshead (GB); LOUGHBOROUGH UNIVERSITY, Loughborough (GB)

(72) Inventors: Andrew M. Cross, Loughborough (GB); Arash Amiri, Loughborough (GB)

(73) Assignee: TURBO POWER SYSTEMS LTD., Gateshead (GB)

( * ) Notice: Subject to any disclaimer, the term of this patent is extended or adjusted under 35 U.S.C. 154(b) by 0 days.

(21) Appl. No.: 17/102,177

(22) Filed: Nov. 23, 2020

(65) Prior Publication Data

US 2021/0159805 A1 May 27, 2021

(30) Foreign Application Priority Data

Nov. 21, 2019 (GB) ........................... 1916997

(51) Int. Cl.
 *H02M 5/293* (2006.01)
(52) U.S. Cl.
 CPC .......... *H02M 5/293* (2013.01); *H02M 5/2932* (2021.05)
(58) Field of Classification Search
 CPC ............................ H02M 5/293; H02M 5/2932
 USPC .................................................. 363/124, 131
 See application file for complete search history.

(56) References Cited

U.S. PATENT DOCUMENTS

| | | | | |
|---|---|---|---|---|
| 5,063,490 A * | 11/1991 | Maehara | ............... | H05B 41/392 363/37 |
| 5,930,127 A * | 7/1999 | Iwahori | .................. | H02M 1/425 363/37 |
| 7,315,462 B2 * | 1/2008 | Melhem | ............... | H02M 7/5387 363/37 |
| 8,669,744 B1 * | 3/2014 | Vinciarelli | ............ | H02M 3/156 323/235 |
| 2002/0141213 A1 * | 10/2002 | De Vries | .......... | H03K 17/04163 363/124 |
| 2010/0259959 A1 * | 10/2010 | Hatanaka | ............... | H02M 7/538 363/131 |
| 2011/0141785 A1 * | 6/2011 | Duan | ................... | H02M 7/4807 363/131 |
| 2013/0293008 A1 * | 11/2013 | Quigley | .................. | H02M 1/34 307/11 |

FOREIGN PATENT DOCUMENTS

EP 0928057 B1 * 9/2003 ............ H02M 3/158

* cited by examiner

*Primary Examiner* — Gary A Nash

(74) *Attorney, Agent, or Firm* — Kinney & Lange, P.A.

(57) ABSTRACT

An alternating current power electronic converter includes an alternating current chopper circuit including two pairs of switches, each switch of a pair connected in series and the two pairs of switches connected in parallel. Each switch of a pair is a uni-directional switch. The uni-directional switches of each pair are arranged in opposing directions, and the uni-directional switches of one pair of switches are arranged in an opposing configuration to the uni-directional switches of the other pair of switches. The circuit comprises a bridge connection between switches of each pair of switches. A controller is configured to control a sequence of operation of the switches, providing an overlap period whenever one of the switches of a pair changes from open to closed and the other switch of the pair changes from closed to open. During the overlap period the switch that is moving from closed to open remains closed.

22 Claims, 21 Drawing Sheets

ELECTRICITY DISTRIBUTION NETWORKS

CROSS-REFERENCE TO RELATED APPLICATION(S)

This application claims priority to British Application No. 1916997.8 filed on Nove. 21, 2019, which is incorporated herein by reference.

TECHNICAL FIELD

The present disclosure relates to improvements in electricity distribution networks, and in particular to improvements permitting electricity to be distributed at an increased voltage to end user properties.

BACKGROUND

Electricity distribution networks are divided into different parts, the different parts operating at different voltages and currents. It is well understood that heat losses when electricity is passed through a conductor are related to the square of the current. For this reason, where electricity is transmitted in significant amounts and/or over significant distances it is common practice to increase the voltage and decrease the current. However, urban electricity distribution networks operate at lower voltages. In the United Kingdom for instance electricity is distributed from a substation to a few hundred domestic and commercial properties at the phase voltage of 230 V at 50 Hz with an expected continuous load of between 1 and 2 kW per property. The substation includes transformers which step the voltage down from a typical incoming line/phase voltage of 11/6.35 kV to 400/230 V+10/−6%.

There is a need to enhance the capacity of the urban electricity distribution network. The cables used in the urban electricity distribution network have a capacity to operate at line/phase voltage of 600/346 V. If they could be operated at phase voltage of 346 V instead of 230 V the current could be dropped and hence electrical power could be delivered to end users with less loss, thereby freeing up capacity on the network. Alternatively, If operated at phase voltage of 346 V instead of 230 V, but at the same current and subsequent same losses, the electrical power delivered to end users are increased.

There are increasing demands on the electricity distribution network to cope with distributed generation. For example, it is very common for houses to have a small number of solar panels installed on their roofs. This distributed generation can cause network over-voltages when the net generated power is fed back into the network. A voltage controller would make properties connected to the network downstream of such a controller less sensitive to over-voltages caused by distributed generation. It would be desirable to enable the part of the network that is operated presently at 230 V to operate at 346 V. This could be facilitated by placing a power electronic converter known as an AC chopper between a 346 V supply and the meter box of the end user.

However, with traditional AC chopper circuits which provide a continuous neutral connection there are problems associated with switching.

A traditional chopper for AC operation requires at least two bidirectional switches which conduct alternately. While one of the bi-directional switches connects the load to the AC supply, the other furnishes a path to the load current when supply is disconnected, that is providing a freewheeling path for the load current. The timing operation of the switches is critical because an overlap in their conduction intervals short-circuits the supply, whereas simultaneous opening of both switches may result in over-voltages due to the magnetic energy stored in the load.

Traditionally, an AC chopper circuit has either a voltage or current dependent switching pattern. Such a circuit is illustrated in FIG. 17.

In a voltage dependent switching pattern, for a positive input voltage polarity switches $S_2$ and $S_4$ are on and switches $S_1$ and $S_3$ are pulse width modulated to chop the positive AC voltage. In order to avoid short-circuiting the input voltage a dead-time is required during the switching transition between $S_1$ and $S_3$. When the input voltage polarity is negative the switches $S_1$ and $S_3$ are on and switches $S_2$ and $S_4$ are pulse width modulated to chop the negative AC voltage. A dead-time is required during the switching transition between $S_1$ and $S_3$. Error in voltage polarity detection (which may happen during the voltage zero-crossing) results in short-circuiting the supply via the always on switches and freewheeling diodes of pulse width modulated switches.

Where the switching pattern is current dependent any error in current direction (which may happen during the current zero-crossing) results in floating (an open circuit) of the inductor current. This will cause extremely destructive high voltages across the devices forming the chopper circuit. In order to avoid malfunction of the chopper circuit a clamping circuit must be provided. This clamping circuit can be caused to operate in every 50 Hz cycle which results in significant losses and distortions on the input and output voltage and the currents.

One existing prior-art circuit shown in FIG. 18, overcomes the problem of errors in both the voltage and current dependent modes by modifying the topology such that the switching pattern becomes independent of the supply voltage and output current polarities. The circuit removes the need for dead time. However, it does require bulky and inefficient snubbers, which increase the size and cost of the device and decrease its efficiency, which restricts its use to very low power applications.

It has been discovered that by providing an over-lap to the circuit in FIG. 18 a current flow path for the inductor current can be guaranteed, thereby preventing floating of the inductor current.

SUMMARY

According to a first aspect of the present disclosure there is provided an alternating current power electronic converter comprising an alternating current chopper circuit including two pairs of switches each switch of a pair connected in series and the two pairs of switches connected in parallel, wherein each switch of a pair is a uni-directional switch and wherein the uni-directional switches of each pair are arranged in opposing directions and wherein the uni-directional switches of one pair of switches are arranged in an opposing configuration to the uni-directional switches of the other pair of switches, and wherein the circuit comprises a bridge connection between the two pairs of switches, the bridge connection being between the uni-directional switches of each pair. the converter further comprising a controller, wherein the controller is configured to control the sequence of operation of the switches, the sequence providing an overlap period whenever one of the uni-directional switches of a pair changes from open to closed and the other uni-directional switch of the pair changes from closed to open, and wherein during the overlap period the uni-directional switch that is moving from closed to open remains closed.

Preferably, each of the uni-directional switches includes a transistor and a diode and wherein the diodes of each pair are arranged in opposing directions and wherein the diodes of one pair of switches are arranged in an opposing configuration to the diodes of the other pair of switches.

The alternating current power electronic converter may further comprise an inter-phase transformer comprising two inductors is connected to each pair of switches, and wherein the connection to each pair of switches is between the switches of each pair.

The alternating current power electronic converter may further comprise an LC filter, wherein the LC filter is connected to the inter-phase transformer and ground.

The alternating current power electronic converter may further comprise a voltage clamp arranged to clamp the voltage across the inductors of the inter-phase transformer on shut-down of the alternating current electronic power converter.

Advantageously, the voltage clamp is an active clamp or a passive clamp.

Preferably, the controller is configured to control the sequence of operation of the uni-directional switches such that the sequence provides a dead-time when opening and/or closing switches of different pairs of switches.

Advantageously, the controller includes one or more of: a pulse width modulator; a dead-time generator and a sequence multiplexer.

The control unit may include one or more of: a voltage polarity detector; a voltage controller; a current controller and a voltage and/or current controller.

The voltage polarity detector may be an opto-isolator.

Preferably, the configuration of inductors is one of: a cumulatively coupled series configuration; and a differentially coupled series configuration.

The controller may be configured to operate the switches of the pairs to provide dead-time when opening and closing switches of different pairs of switches and overlap when opening and closing switches of a pair.

According to another aspect of the present disclosure there is provided a power distribution network comprising:

a local substation having a high voltage input in the order of thousands of volts and a low voltage output in the order of hundreds of volts;

electricity distribution cabling connected to the output of the local substation;

at least one electricity consumer connected to the cabling, the at least one electricity consumer operating at a voltage that is less than the output of the substation; and an alternating current power electronic converter according to the first aspect of the present disclosure situated between the electricity distribution cabling and the electricity consumer, wherein the input voltage to the alternating current power electronic converter is the output voltage of the local substation and the output voltage of the alternating current power electronic converter corresponds to the operating voltage of the at least one electricity consumer.

Preferably, the input line/phase voltage to the local substation is 11/6.35 kV+10/−6%

Preferably, the maximum output line/phase voltage of the local substation is 600/346 V.

Preferably, the output voltage of the alternating current power electronic converter is 230 V+10%/−6%.

BRIEF DESCRIPTION OF THE DRAWINGS

In the Drawings, which illustrate preferred embodiments of the power electronic converter according to the present disclosure and circuits known in the art:

FIG. 12 is a circuit diagram illustrating a passive clamp;

DETAILED DESCRIPTION

Figure 1:
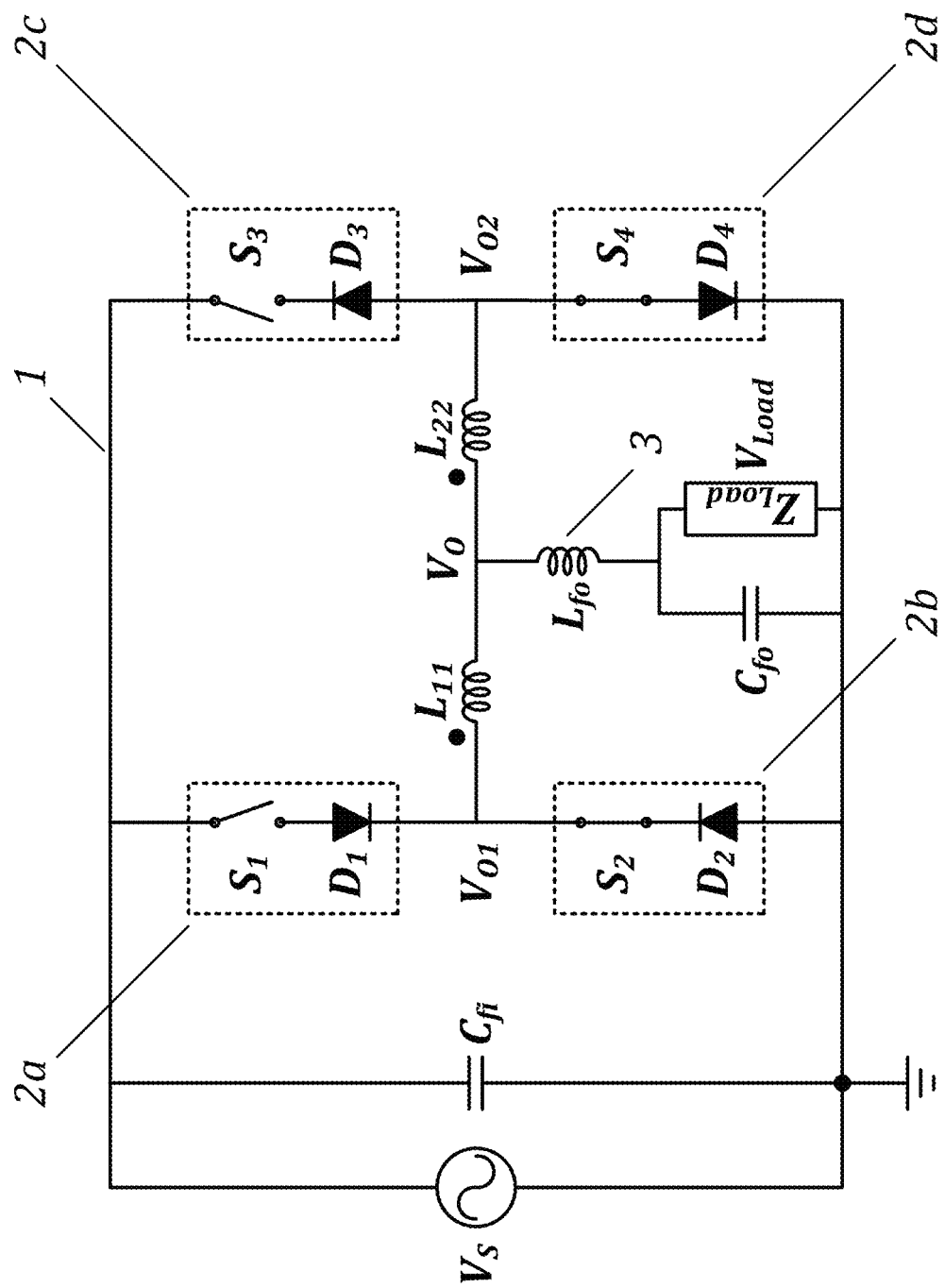
FIG. 1 is a circuit diagram of the chopper circuit which forms part of the present disclosure.

Referring now to FIG. 1, the power electronics converter is in the form of a new AC chopper circuit 1. The circuit 1 includes an input power supply Vs which provides an alternating voltage. The circuit 1 comprises four uni-directional switch units 2a to 2d. The switch units operate in pairs 2a, 2b and 2c, 2d. Each uni-directional switch unit comprises a switch $S_1$ to $S_4$ and a diode $D_1$ to $D_4$. Each switch $S_1$ to $S_4$ is a transistor. Each transistor is connected in series with a respective diode $D_1$ to $D_4$. The switch units 2a, 2b and hence switches $S_1$, $S_2$ and their respective diodes $D_1$, $D_2$ are connected in series in a pair. The switch units 2c, 2d and hence switches $S_3$ and $S_4$ and their respective diodes $D_3$, $D_4$ are also connected in series in a pair.

The switches $S_1$ and $S_2$ and their respective diodes $D_1$, $D_2$ are arranged to permit the flow of current in opposite directions. Current flowing in a direction permitted by diode $D_1$ cannot flow through $D_2$ and similarly, current flowing in the opposite direction is permitted by diode $D_2$ but prevented by diode $D_1$.

The pairs of switch units are connected in parallel. An inductor circuit 3 connects the respective pairs of switches 2a, 2b to 2c, 2d, forming a bridge therebetween.

An inductor circuit 3 comprises mutual inductors $L_{11}$ and $L_{22}$ which are connected together and to the two legs of the chopper circuit 1 between the diodes $D_1$, $D_2$ of the switch unties 2a, 2b and the diodes $D_3$, $D_4$ of the switch units 2c, 2d. The inductor circuit 3 includes an inductor capacitor filter which comprises an inductor $L_{fo}$ connected in series with a capacitor $C_{fo}$ and a load $Z_{load}$. The capacitor $C_{fo}$ and load $Z_{load}$ are connected in parallel.

FIG. 1 illustrates one possible configuration of the mutual inductors $L_{11}$, $L_{22}$, that being a cumulatively coupled series configuration. It is also possible for the inductors $L_{11}$, $L_{22}$ to be connected in a differentially coupled series.

Figure 2:
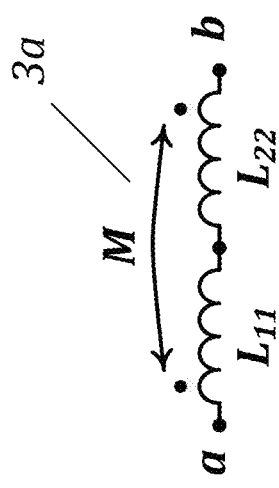
FIG. 2 illustrates a cumulatively coupled series connection of the inductors of the circuit illustrated in FIG. 1.

FIG. 2 illustrates an inductor circuit 3a having a cumulatively coupled series configuration of inductors $L_{11}$, $L_{22}$ in which the current flows through the inductors $L_{11}$, $L_{22}$ in the same direction. The equivalent blocking inductance from this arrangement across a-b is:

$$L_{ab}=(L_{11}+M)+(L_{22}+M)=L_{11}+L_{22}+2M$$

Figure 3:
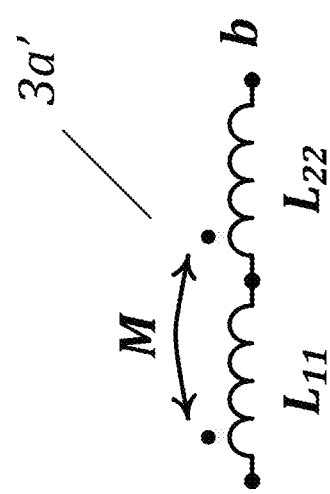
FIG. 3 illustrates a differentially coupled series connection of the inductors of the circuit illustrated in FIG. 1.

FIG. 3 illustrates a circuit 3a' having differentially coupled series inductors $L_{11}$, $L_{22}$ in which the current flows through the inductors $L_{11}$, $L_{22}$ in opposing directions. In this arrangement the equivalent blocking inductance across a-b is:

$$L_{ab}=(L_{11}+M)+(L_{22}+M)=L_{11}+L_{22}+2M$$

FIGS. 4 to 12 all relate to the cumulative coupled series inductors illustrated in FIGS. 1 and 2.

The diodes $D_1$, $D_2$ and $D_3$, $D_4$ are arranged for the passage of electrical current in opposing directions. Due to this arrangement each pair of uni-directional switches 2a, 2b and 2c, 2d are immune to shoot through. This means that no dead-time is required.

Figure 18:
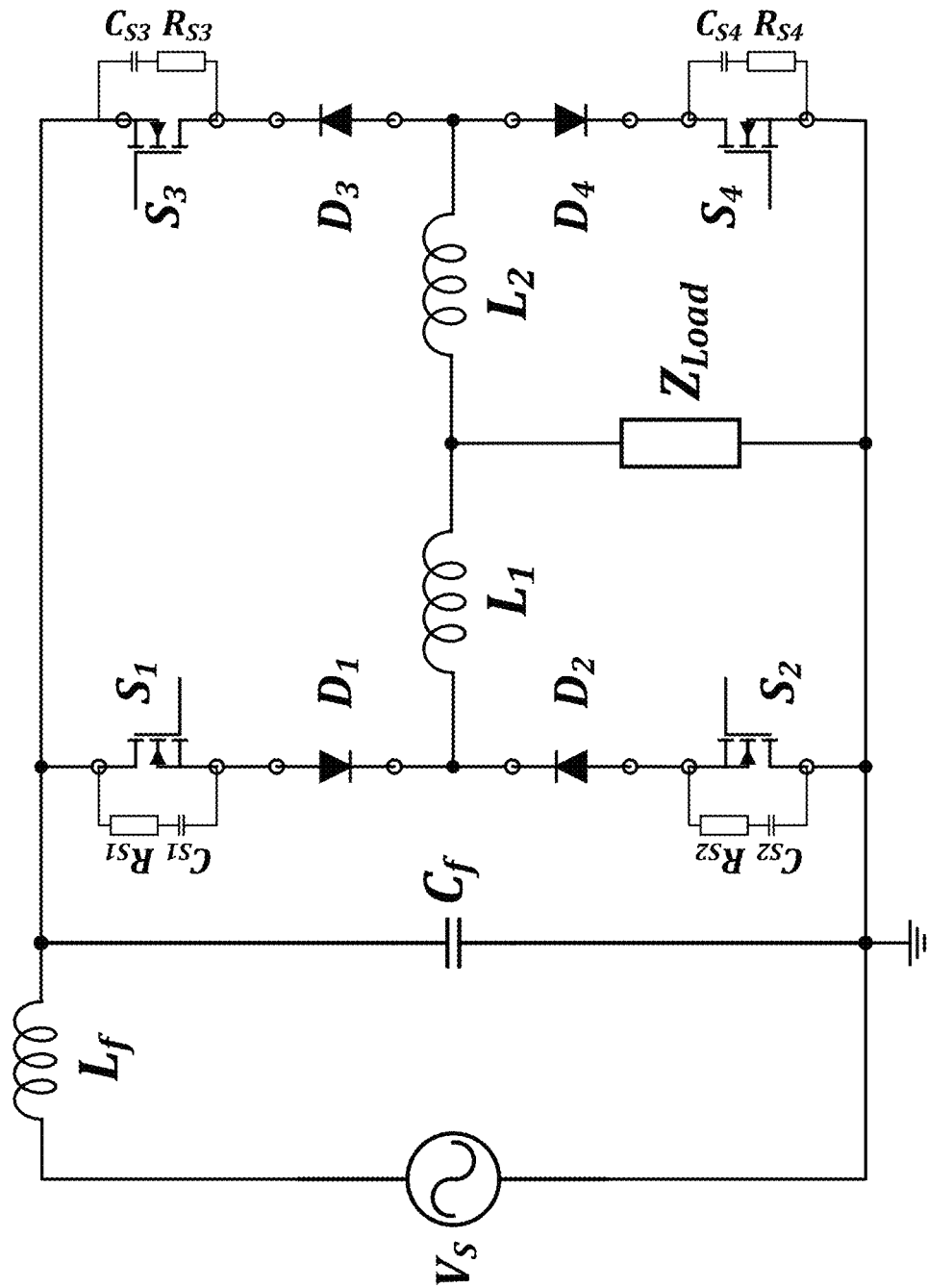
FIG. 18 is a circuit diagram of an alternative AC Chopper circuit of prior art.

The arrangement of a current carrying inductor between the two legs of the circuit means that an overlap in the switching of the transistors $S_1$, $S_2$ and $S_3$, $S_4$ respectively is required in order to remove the need for snubbers that are essential to the circuit shown in FIG. 18. This overlap of switching provides a free-wheeling path for the inductors $L_{11}$, $L_{22}$. The free-wheeling path prevents a floating current developing in the inductors $L_{11}$, $L_{22}$.

Dead-time is required between the switching of switches 2a, 2d and 2c, 2b. Where the input voltage is positive (Vs>0), switch pairs 2a, 2d could short circuit the input source via inductors $L_{11}$, $L_{22}$ if they were on simultaneously. Hence, a blank time (dead-time) is required between switching on 2a and switching on 2d.

Similarly, when the input voltage is negative (Vs<0), the switches 2b, 2c could short circuit the input source via inductors $L_{11}$, $L_{22}$ if they were on simultaneously. Hence, a dead-time is required between switching on 2b and switching on 2c.

The circuit 1 avoids shoot-through when switching between legs by providing a voltage polarity based switching pattern which selects the priority of the switching legs and a dead-time between during which only one of the switches 2a, 2d or 2b, 2c is on.

Figure 4:
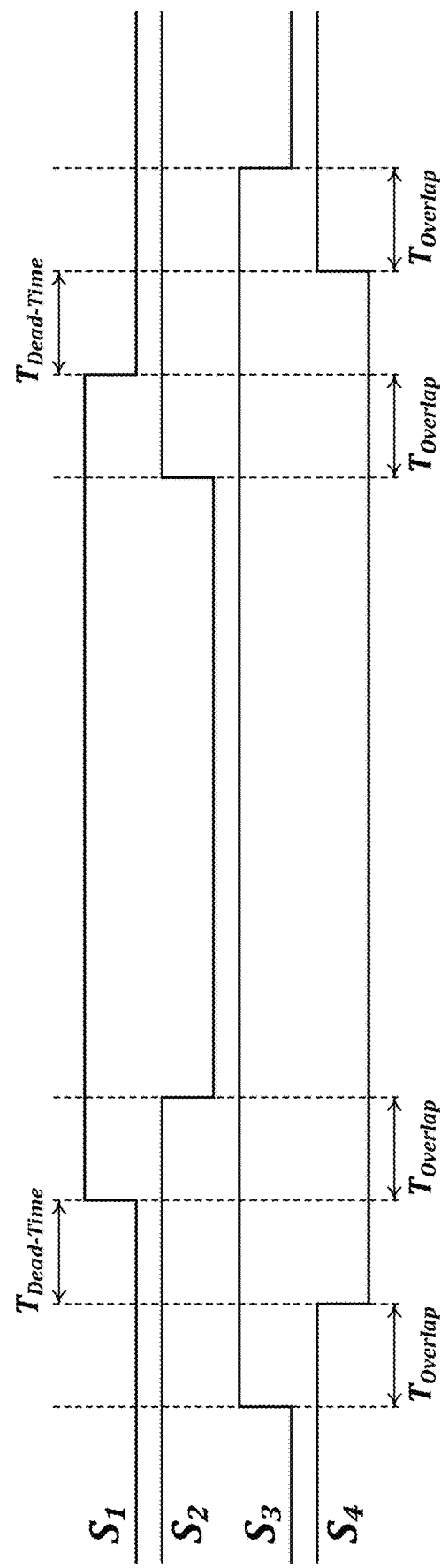
FIG. 4 illustrates the switching pattern for the transistors of the circuit illustrated in FIG. 1 when the input voltage is positive.

Suitable switching patterns for switches 2a-2d when the input voltage is positive (Vs>0) are shown in FIG. 4.

Figure 5:
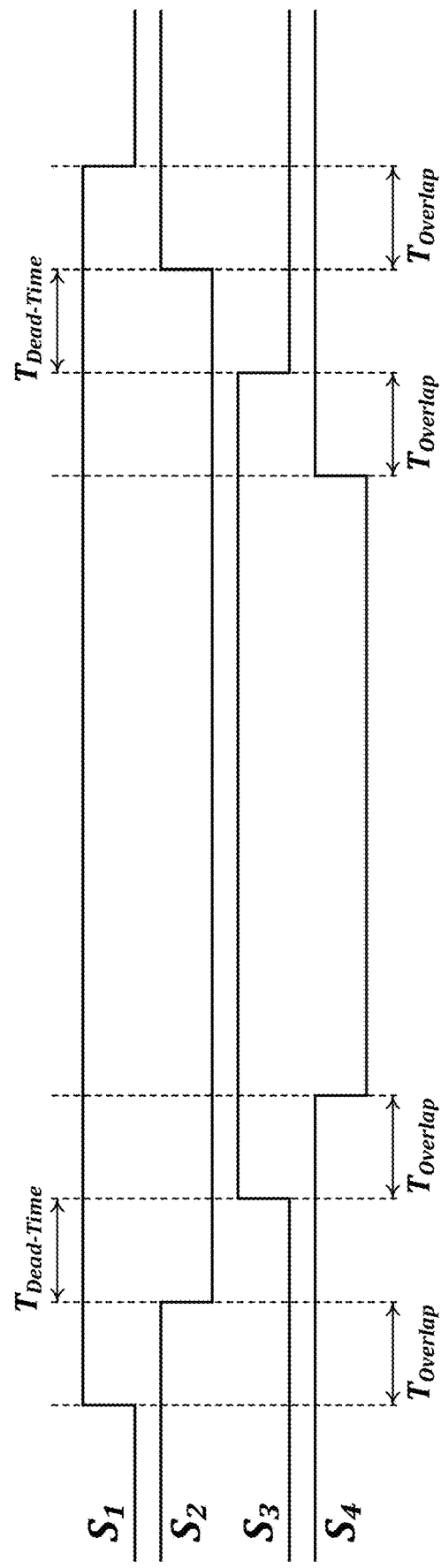
FIG. 5 illustrates the switching pattern for the transistors of the circuit illustrated in FIG. 1 when the input voltage is negative.

Suitable switching patterns for switches 2a-2d when the input voltage is negative (Vs<0) are show in FIG. 5.

FIGS. 4 and 5 show that for each commutation there are two overlap periods and one dead-time period. The overlap period must be long enough to ensure that the switching transition of the transistors $S_1$ to $S_4$ of switch 2a to 2d have been completed. The duration of overlap period is function of the switching speed of semiconductors and varies from tens of nanoseconds to a few microseconds.

Figure 6:
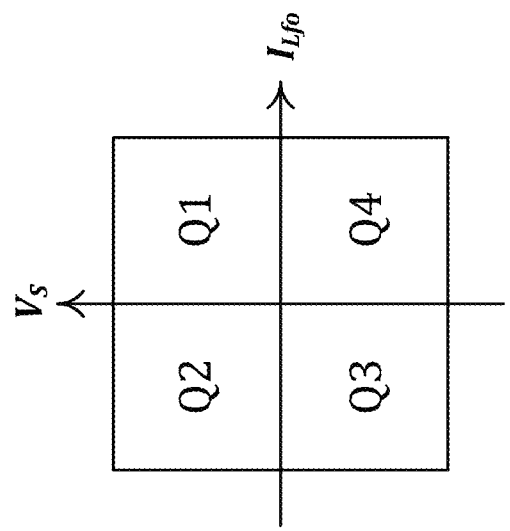
FIG. 6 is a schematic illustrating operating quadrants of the circuit illustrated in FIG. 1 based on polarity of input voltage and polarity of output current.

Referring now to FIG. 6, the circuit 1 is operated on a four quadrant (quadrants Q1 to Q4) methodology based on the polarity of the input voltage ($V_s$) and direction of the output current ($I_{Lfo}$). In quadrant Q1 the input voltage $V_s$ is positive ($V_s$>0) and the output inductor current ($I_{Lfo}$) is positive ($I_{Lfo}$>0). In quadrant Q2 the input voltage (Vs) is positive ($V_s$>0) and the output inductor current ($I_{Lfo}$) is negative ($I_{Lfo}$<0). In quadrant Q3 the input voltage ($V_s$) is negative ($V_s$<0) and the output inductor current ($I_{Lfo}$) is negative ($I_{Lfo}$<0) and in Q4 the input voltage is negative ($V_s$<0) and the output inductor current ($I_{Lfo}$) is positive ($I_{Lfo}$>0).

FIGS. 7a to 7c and 8 illustrate the operation of the circuit in Q1, that is positive input voltage ($V_s$>0) and the positive output inductor current ($I_{Lfo}$>0).

Figure 7A:
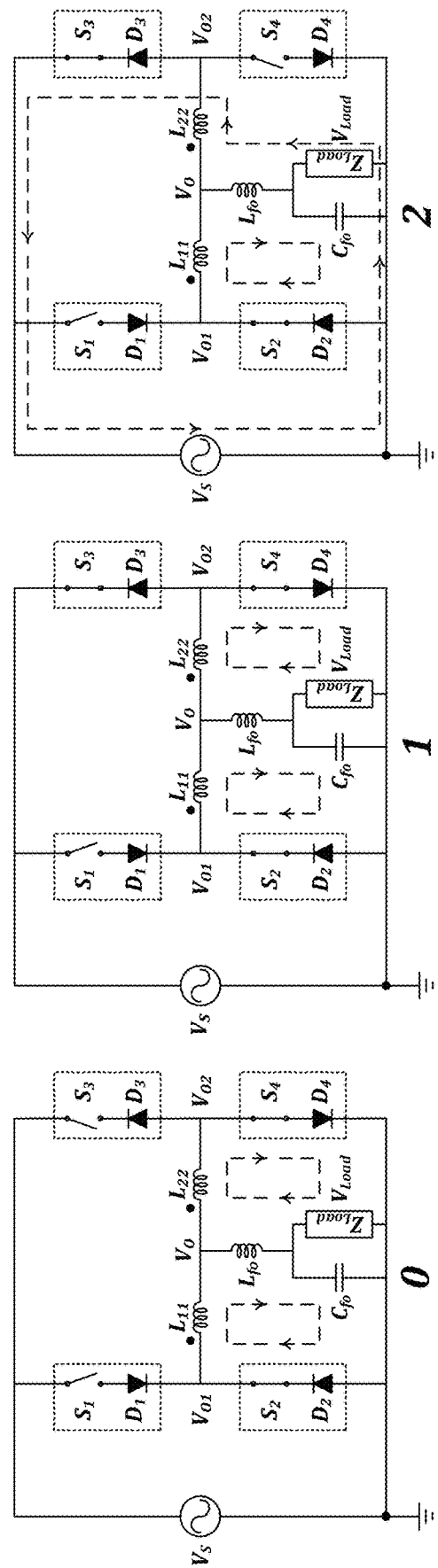
FIGS. 7a to 7c illustrate the circuit shown in FIG. 1 in different states through a full switching cycle when the input voltage is positive and the output inductor current is positive.
Figure 7B:
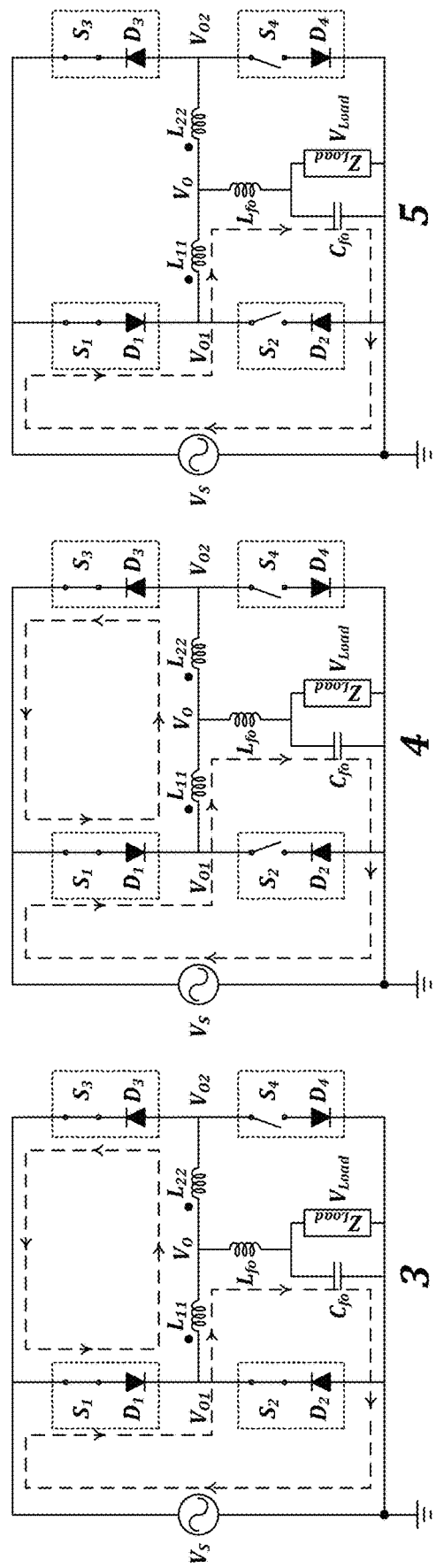
Figure 7C:
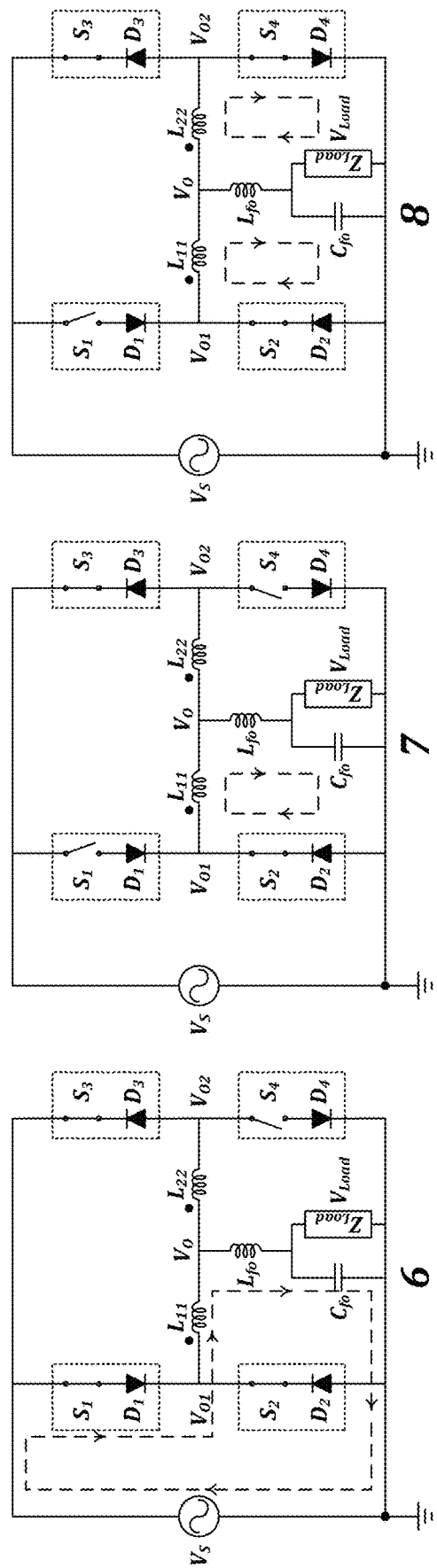
Figure 8:
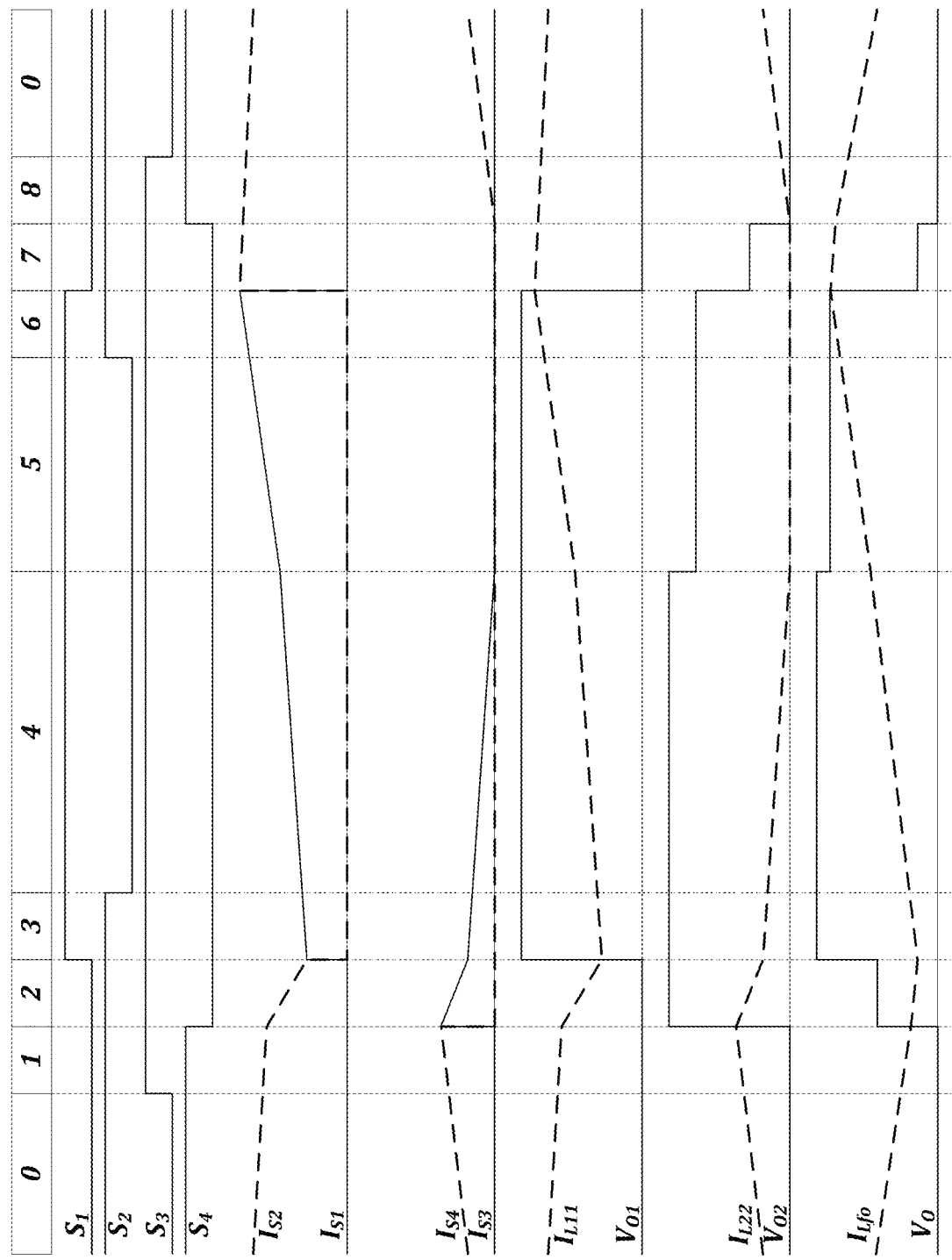
FIG. 8 illustrates the circuit's voltages and currents during a full switching cycle when the input voltage is positive and the output inductor current is positive.

Referring first to FIGS. 7a to 7c, the set of circuit configurations shown are labelled 0 to 8. FIG. 8 shows the switch status, switch current ($I_{S1-S4}$), input voltage ($V_{o1, o2}$) and output inductor current ($I_{Lfo}$) for each numbered circuit configuration of FIGS. 7a to 7c.

FIGS. 7a to 7c illustrate the status of the switches $S_1$ to $S_4$ in the circuit 1 during a full cycle of switching when the input voltage is positive and the output inductor current ($I_{Lfo}$) is positive.

In configuration 0 switches $S_1$, $S_3$ are open and $S_2$, $S_4$ are closed providing a conductive pathway through the inductor bridge.

Configuration 1 provides an overlap period during which switch $S_4$ remains closed whilst switch $S_3$ moves from open to closed. The overlap period allows the closed and open switches in the leg $S_3$, $S_4$ to change. The overlap period provides the continuous free-wheeling path required by the inductors $L_{11}$, $L_{22}$ and output filter inductor $L_{fo}$. Configuration 2 provides a period of time (a dead-time) in which $S_1D_1$ has not changed state (is remains open) whereas $S_4D_4$ has changed state (from closed to open).

Configuration 3 provides another overlap period for switching $S_1D_1$ from open to closed and $S_2D_2$ from closed to open in which the status of $S_1D_1$, $S_2D_2$ overlap (they are both closed in configuration 3).

Configurations 4 and 5 provide a circuit configuration in which current flows.

Configurations 6, 7 and 8 correspond to configurations 4, 3 and 2 respectively.

Figure 9A:
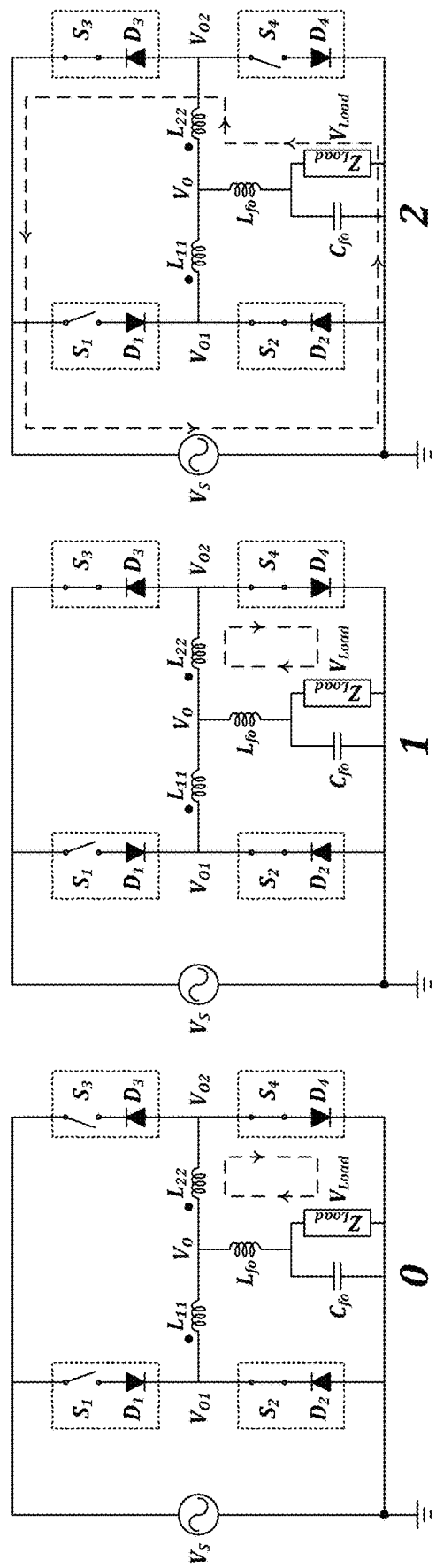
FIGS. 9a to 9c illustrate the circuit shown in FIG. 1 in different states through a full switching cycle when the input voltage is positive and the output inductor current is negative.
Figure 9B:
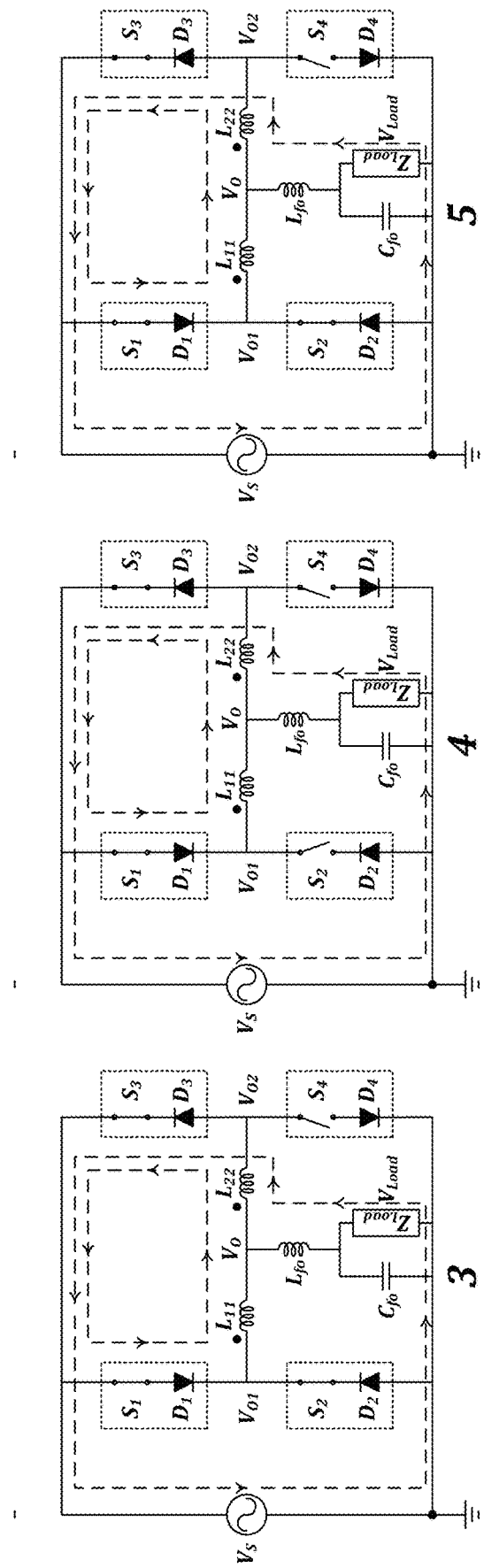
Figure 9C:
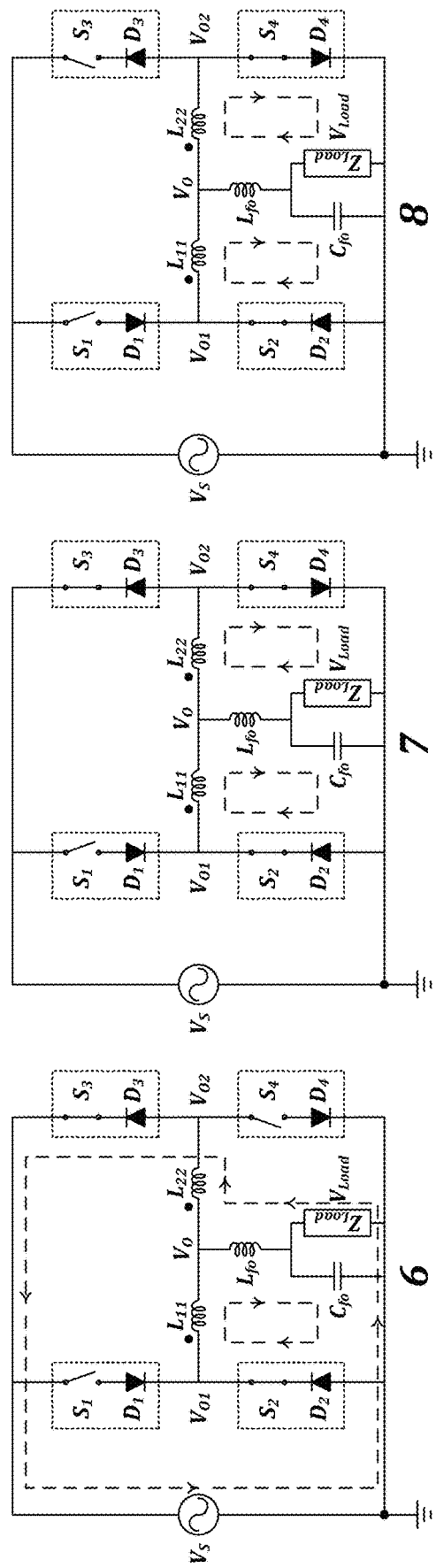

FIGS. 9a to 9c illustrate the configuration of the circuit 1 in quadrant 2 of FIG. 6, that is when the input voltage is positive (Vs>0) and the inductor current is negative ($I_{Lfo}$<0).

Figure 10:
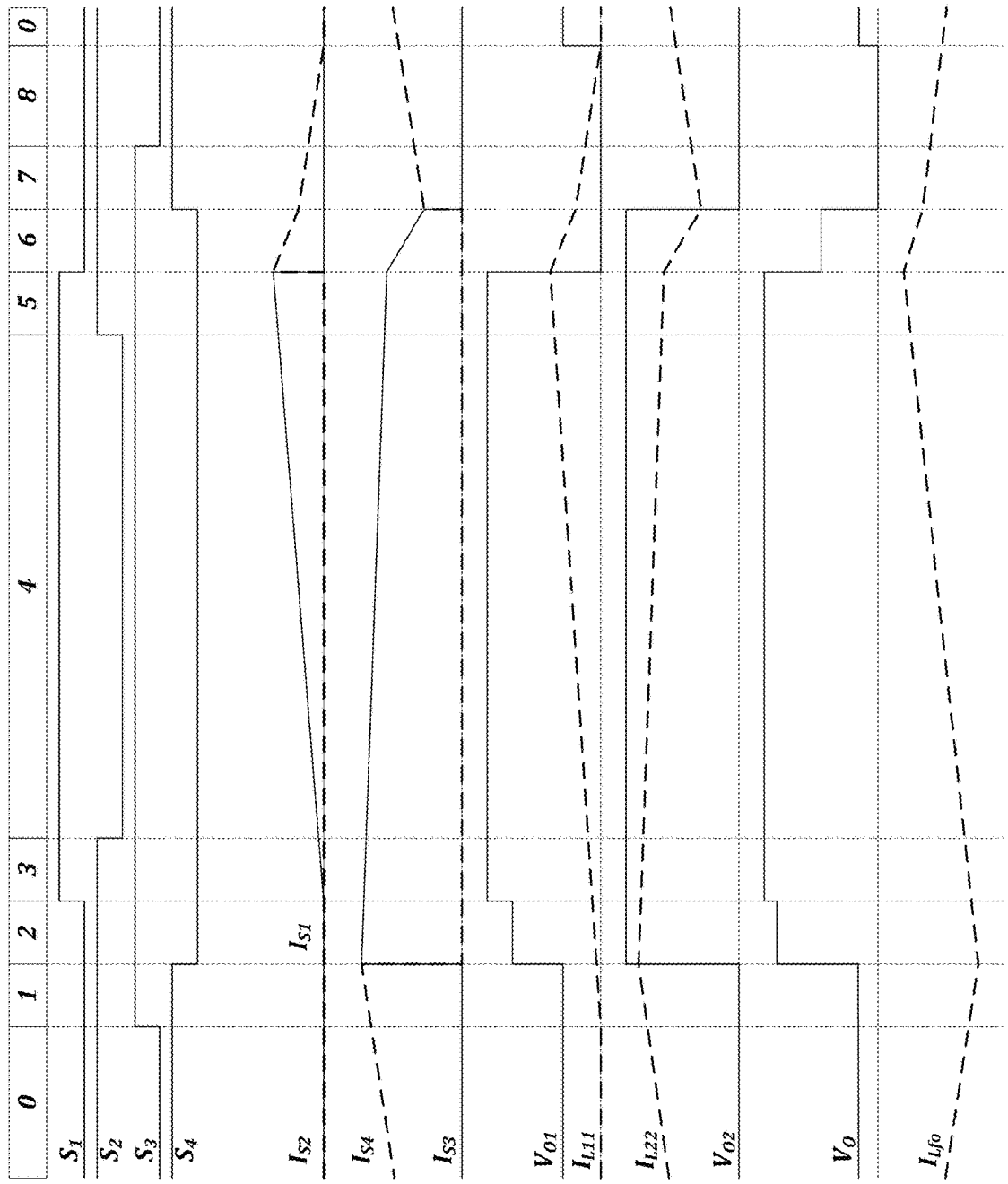
FIG. 10 illustrates the circuit's voltages and currents during a full switching cycle when the input voltage is positive and the output inductor current is negative.

FIG. 10 shows the switch status, switch current ($IS_1$-$S_4$), input voltage ($V_{o1, o2}$) and output inductor current ($I_{Lfo}$) for each numbered circuit configuration of FIGS. 9a to 9c.

In configuration 0 switches $S_1$, $S_3$ are open and $S_2$, $S_4$ are closed providing a conductive pathway through the inductor bridge.

Configuration 1 provides an overlap period during which switch $S_4$ remains closed whilst switch $S_3$ moves from open to closed. The overlap period allows the closed and open switches in the leg $S_3$, $S_4$ to change. The overlap period provides the continuous free-wheeling path required by the inductors $L_{11}$, $L_{22}$ and output filter inductor $L_{fo}$.

With a positive input voltage, switch pairs $S_1$, $S_4$ cannot be switched from their current states simultaneously, since to do so can short circuit the input source via $L_{11}$ and $L_{22}$.

Configuration 2 provides a period of time (a dead-time) in which $S_1D_1$ has not changed state (is remains open) whereas $S_4D_4$ has changed state (from closed to open).

Configuration 3 provides another overlap period for switching $S_1D_1$ from open to closed and $S_2D_2$ from closed to open in which the status of $S_1D_1$, $S_2D_2$ overlap (they are both closed in configuration 3).

Configurations 4 and 5 provide a circuit configuration in which $S_1$ and $S_3$ are closed (current flowing) and $S_2$ and $S_4$ open.

The status of switches $S_1$ to $S_4$ in configurations 6, 7 and 8 correspond to status of those switches in configurations 4, 3 and 2 respectively.

Figure 11:
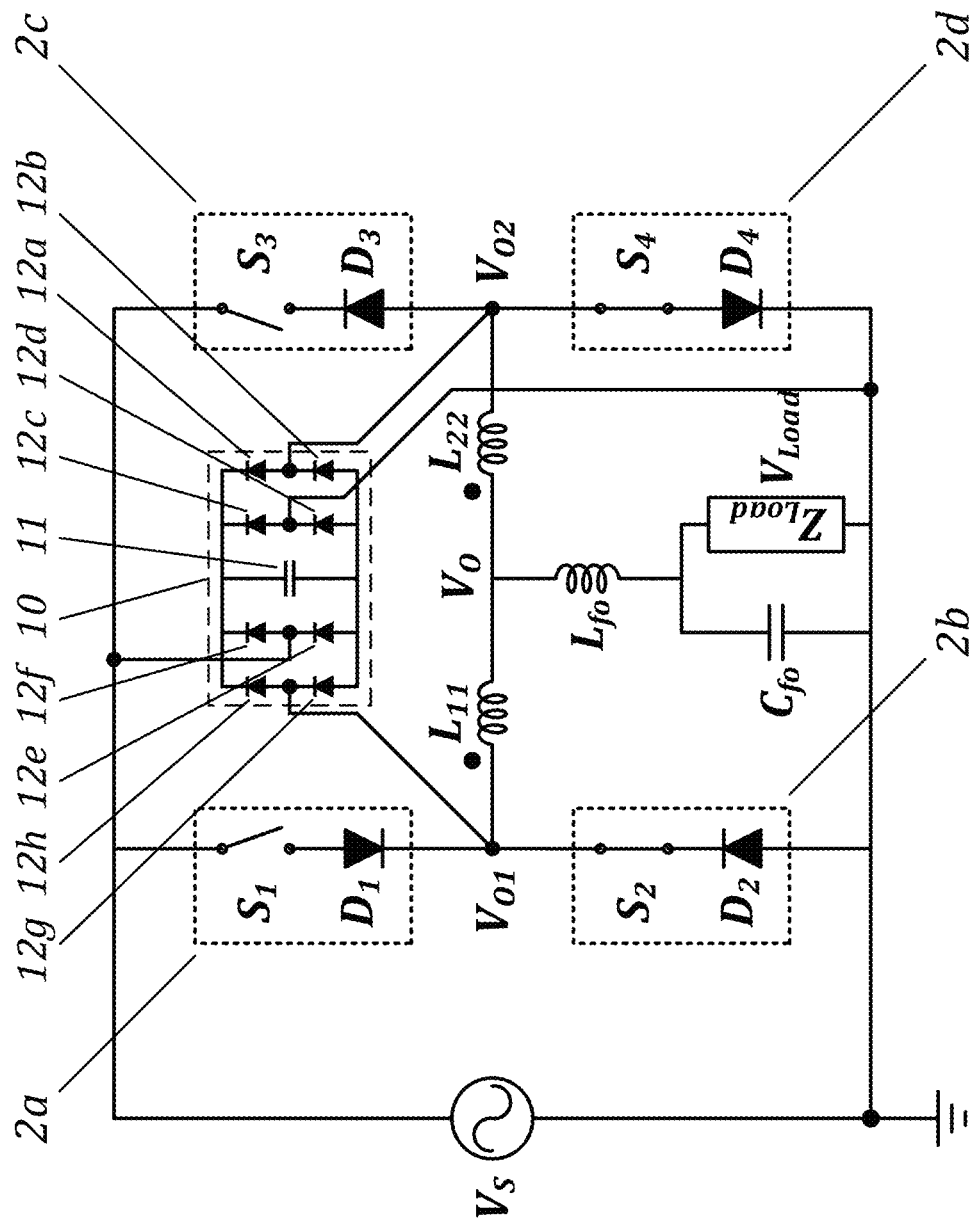
FIG. 11 illustrates the chopper circuit shown in FIG. 1 with a passive over voltage clamp protection circuit.

Referring now to FIG. 11, the basic AC chopper circuit 1 is illustrated with an over voltage protection circuit 10 in the form of a diode clamp. When the transistors are disabled simultaneously, for example during an over-current fault the circuit may be shut down causing the transistors to be disabled simultaneously. This may result in a very high di/dt since the inductors' current has no path through which to circulate. Very high voltages may be generated across the switches. The function of the diode clamp is to protect the circuit against such high voltages that would otherwise be generated across the switches.

The diode clamp circuit 10 comprises a capacitor 11 and four pairs of uni-directional diodes 12a, 12b; 12c, 12d; 12e, 12f; and 12g, 12h. The diode pair 12a, 12b is connected to the circuit 1 between switches 2c, 2d. Diode pair 12g, 12h is connected to circuit 1 between switches 2a, 2b. Diode pair 12c, 12d is connected to ground and diode pair 12e, 12f to Vs, the input voltage. In normal operation the capacitor 11 is charged to the peak input voltage. If a situation arises where all the switches 2a-2d shut down simultaneously, the capacitor 11 is charged above the peak voltage. The capacitor must be sized according to the voltage limit on the switches 2a-2d and the maximum amount of energy that may be trapped in the inductors $L_{11}$, $L_{22}$ and $L_{fo}$.

Figure 13:
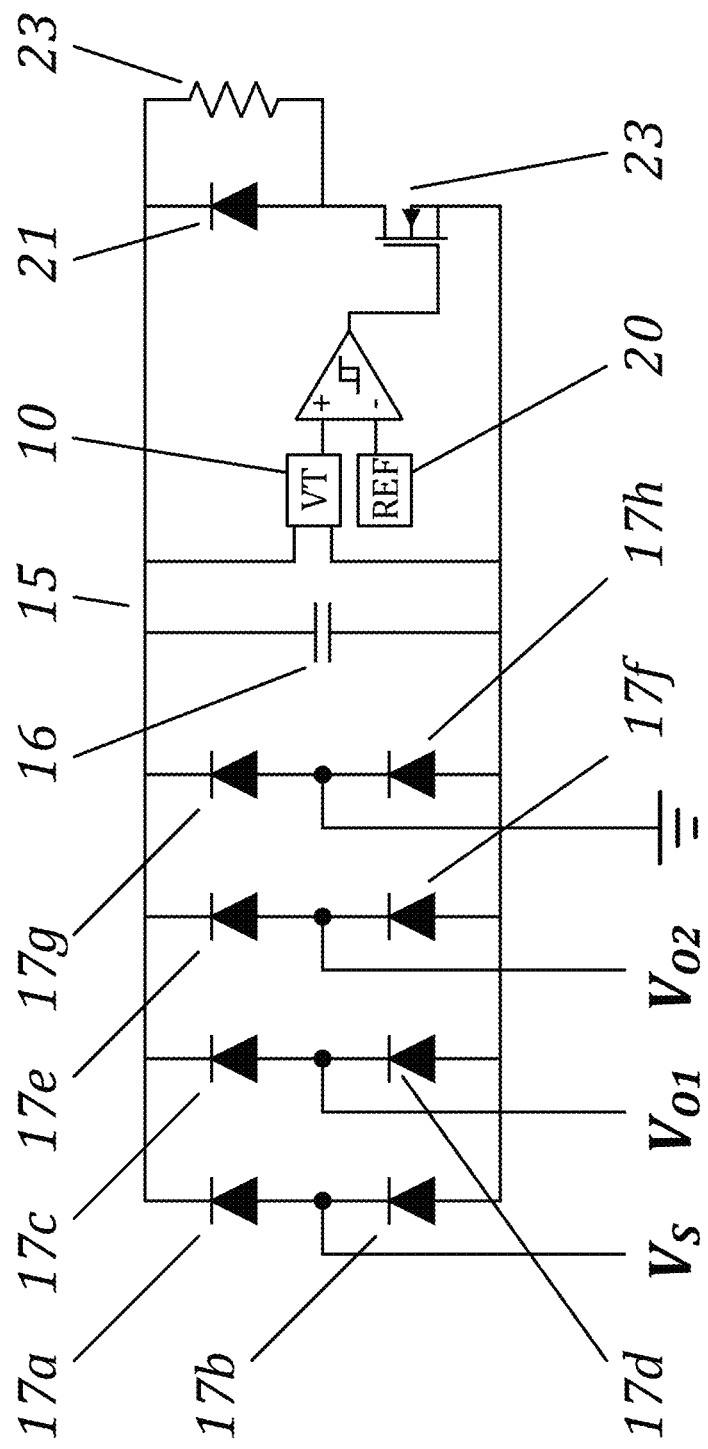
FIG. 13 is a circuit diagram illustrating an active clamp.

An alternative to the diode clamp circuit illustrated in FIG. 11 is an active clamp (illustrated in FIG. 13), which operates and dissipates excessive energy injected into the clamp capacitor only if the voltage on the clamp capacitor rises above a certain threshold. A suitable active voltage clamp circuit 15 is illustrated in FIG. 13. The circuit includes a capacitor 16. If the voltage across the capacitor rises above a reference value, the switch 18, which may be a MOSFET for example, is turned on and excess energy is dissipated through the resistor 22 in order to keep the voltage below the threshold. The circuit 15 induces pairs of diodes 17a, 17b; 17c, 17d; 17e, 17f and 17g, 17h. Diode pair 17g, 17h is connected to ground, diode pair 17a, 17b to Vs, diode pair 17c, 17d to $V_{o1}$ and diode pair 17e, 17f to $V_{o2}$.

Figure 12:
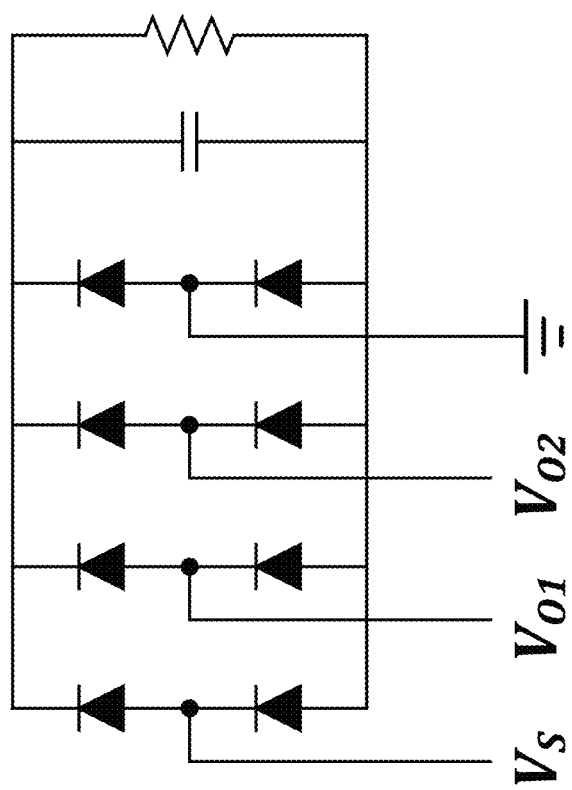
FIG. 12 illustrates the chopper circuit shown in FIG. 1 with an active over voltage clamp protection circuit.

FIG. 12 illustrates a passive clamp similar to the clamp shown in FIG. 11, the difference being the presence of a resistor in parallel with the capacitor thereby providing for continuous power dissipation to keep the voltage across the inductors $L_{11}$, $L_{22}$ within safe limits in the case of a rise in voltage.

Figure 14:
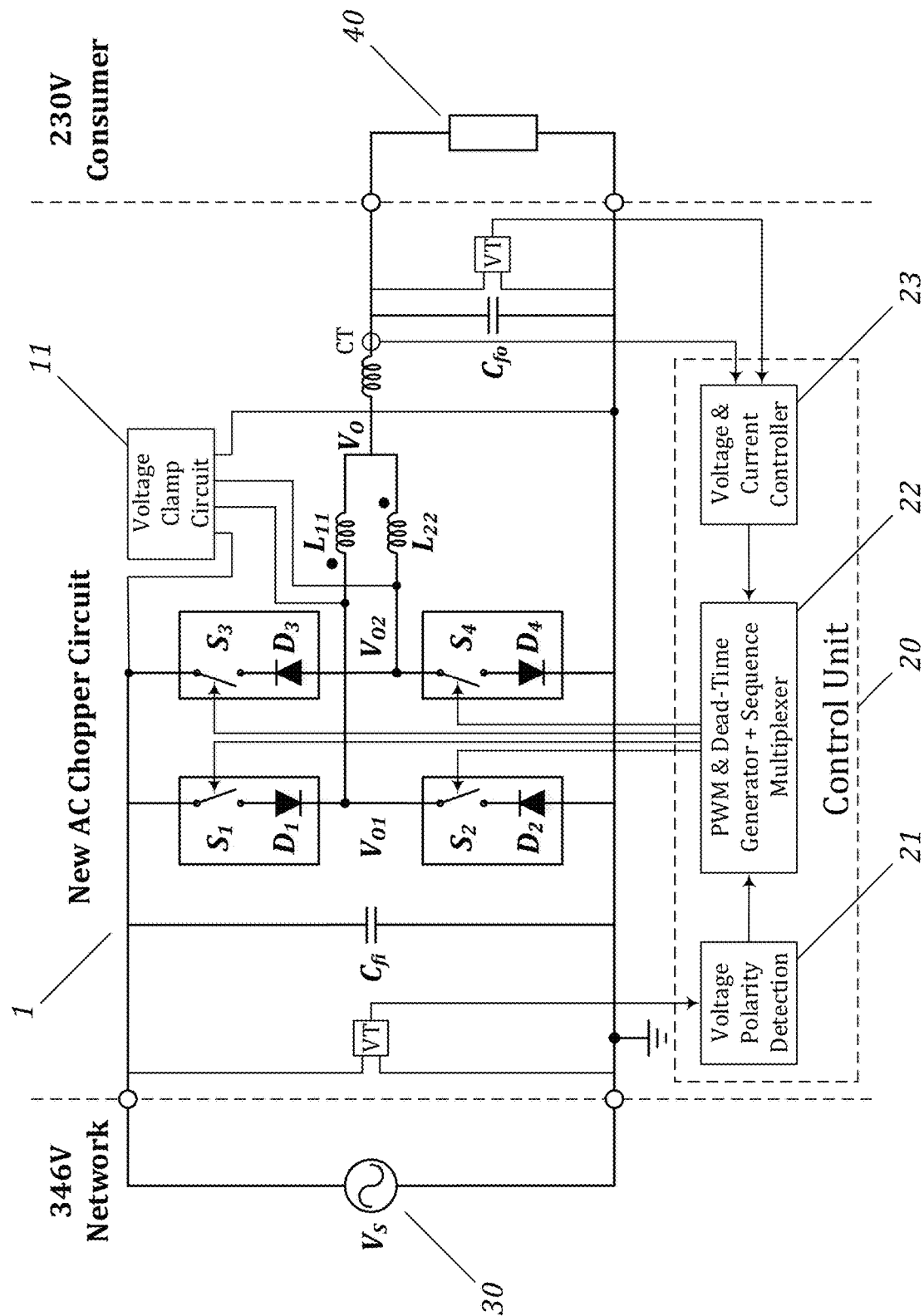
FIG. 14 is a circuit diagram illustrating the power electronic converter located between the 346 V network and the 230 V consumer.

FIG. 14 illustrates the AC chopper circuit 1 showing FIGS. 1 and 11 and its position between the 346 V network 30 and the 230 V consumer circuit 40. The AC chopper circuit 1 includes a voltage clamp circuit 11. A control unit 20 which includes a voltage polarity detector, a pulse width modulator, dead-time generator and sequence multiplier 22 and a voltage and current controller 23 is connected to the network 30, the switches of the AC chopper circuit 1 and the output of the AC chopper circuit 1.

The voltage polarity detector 21 receives a voltage input signal from the network 30. The output of the voltage polarity detection circuit 21 is the input to the pulse width modulator, dead-time generator and sequence multiplexer 22, which receives another input from the voltage and current controller 23. The voltages and current controller 23 receive input signals representing the output current and output voltage fo the AC chopper circuit 1.

Switches 2a to 2d are connected electrically to the pulse width modulator, dead-time generator and sequence multiplexer 22, which controls the sequencing of operation of the switches 2a to 2d.

Figure 15:
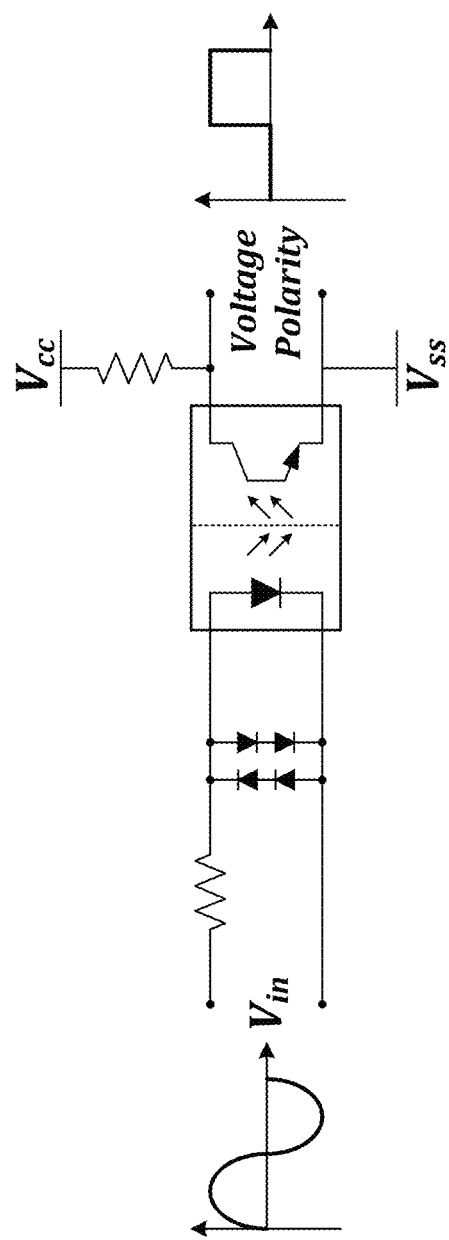
FIG. 15 is a circuit diagram illustrating an opto-coupler based voltage polarity detector circuit.

FIG. 15 illustrates a polarity detector circuit in the form of an opto-isolator. However, errors may occur in the detection of voltage polarity. This may cause the wrong switching sequence to be applied to the transistors of switches 2a-2d. For example, if transistors $S_1$ and $S_4$ are caused to be on during an overlap period shoot through will be caused. The magnitude of the shoot through current is limited by the mutually coupled inductor $L_{11}$ and $L_{22}$, which forms an inter-phase transformer. The shoot through current continues to rise whilst the polarity error exists, but decays back to zero once the error is cleared.

The specification of the inter-phase transformer is a compromise between limiting the size of its magnetizing inductance, the magnitude of the corresponding shoot through current and the duration of voltage polarity errors.

The AC chopper circuit of the present disclosure is very tolerant of errors in detection of voltage polarity. This is due to the inter-phase transformer $L_{11}$, $L_{22}$.

Figure 16:
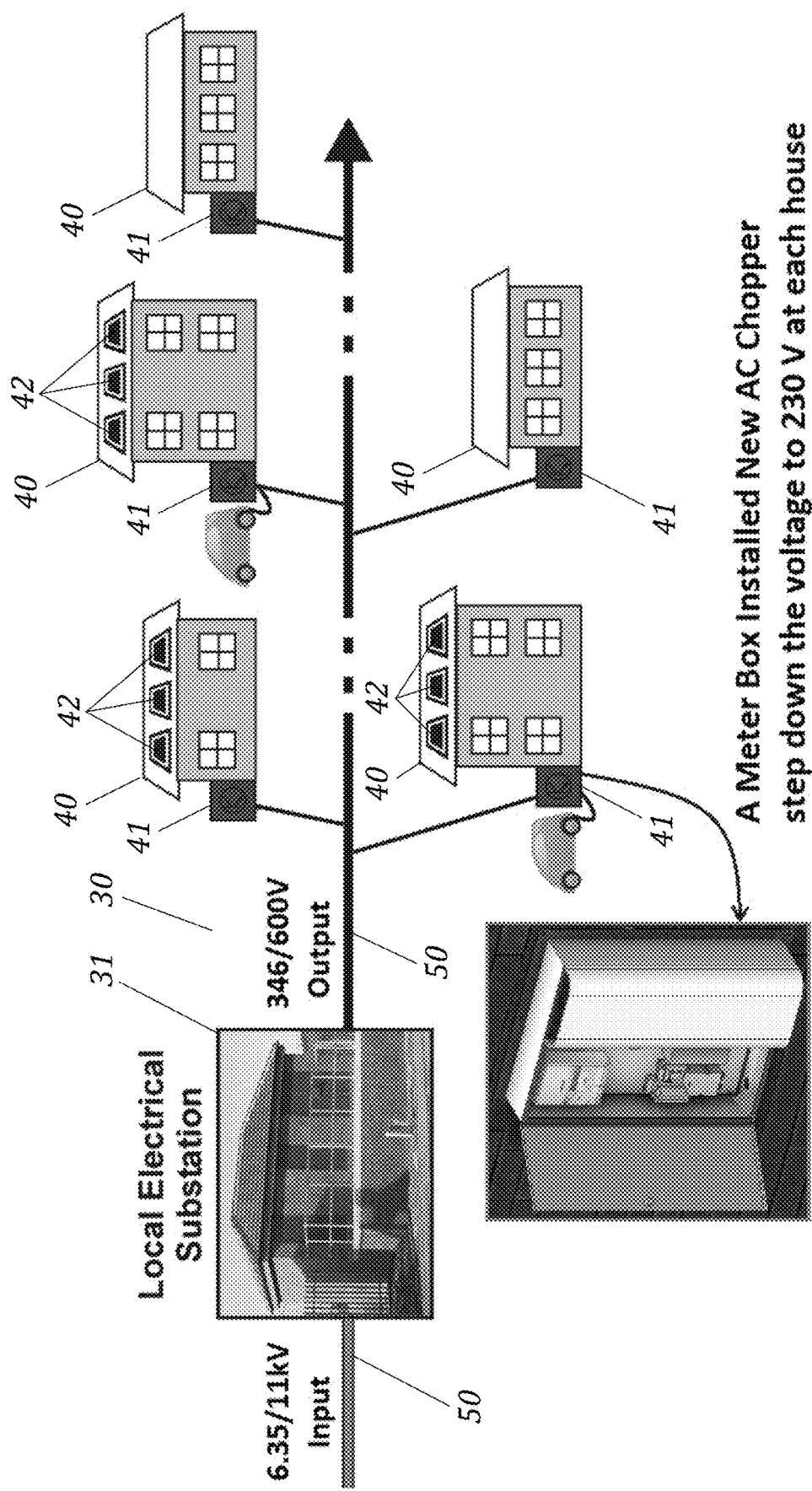
FIG. 16 is a schematic diagram illustrating an electricity distribution network including power electronic converters of the present disclosure.
Figure 17:
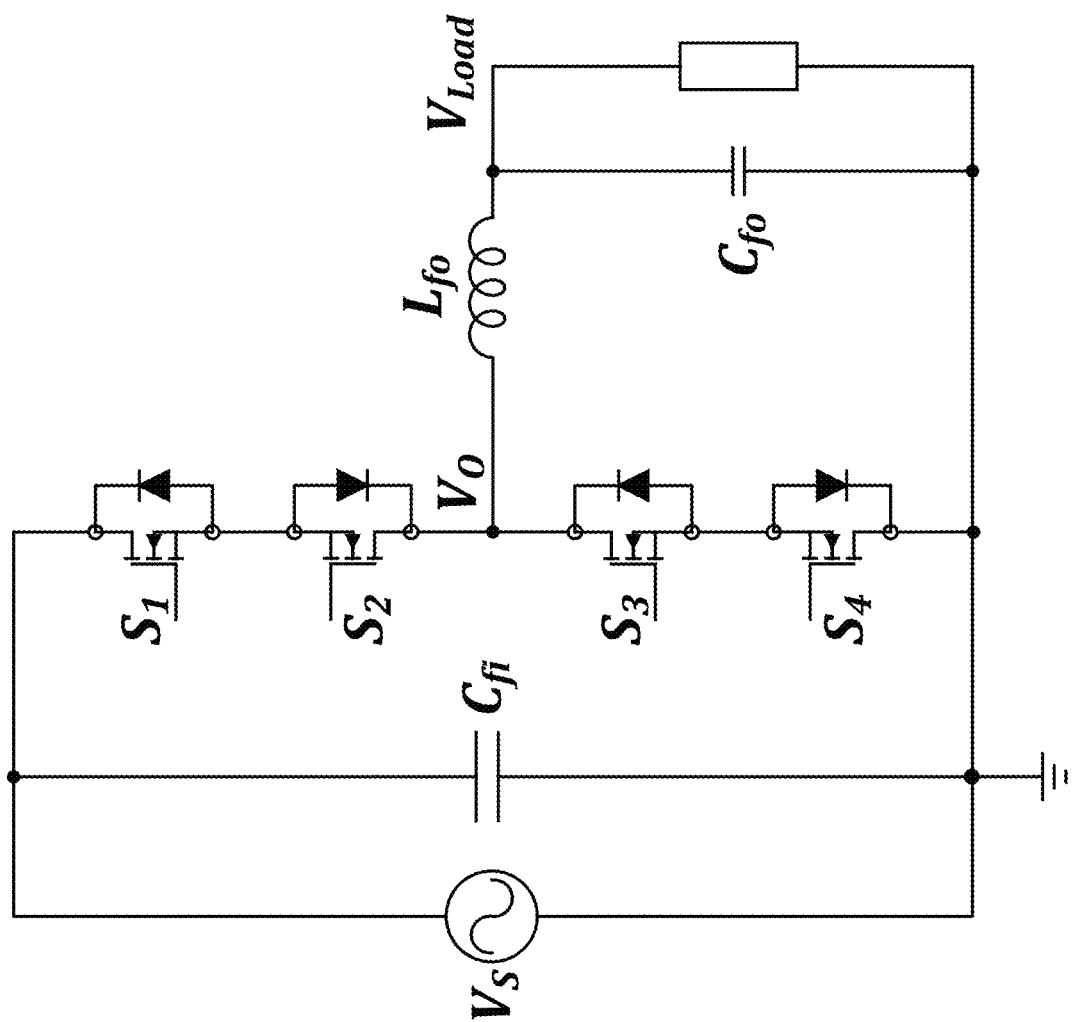
FIG. 17 is a circuit diagram of a traditional AC Chopper circuit.

FIG. 16 is a schematic representation of the local network of a mains electricity distribution network. The local network 30 comprises a substation 31 having a line/phase voltage of 11/6.35 kV input 50 and a 600/346 V output which is distributed along a cable 32. Electricity consuming units, in the form of houses 40 are each provided with a meter box 41. The meter box includes the components illustrated in FIG. 14 which are connected to the network 30 and electricity consuming units 40 in the manner illustrated in FIG. 14. As can be seen from FIG. 16, some of the houses 40 have solar panels 42 mounted on their roofs 43. Some of the houses 40 have electric vehicles 44 connected thereto. The distribution of electricity at 346 V, provides for greater efficiency of transmission, since the resistance losses are much lower than for distributing electricity along cable 32 at 230 V. This becomes more important as the use of electric vehicles and the presence of consumer level power generation increases.

Whilst the AC chopper circuit of the present disclosure is described in relation to a power converter for use in a mains electricity distribution network, the circuit has other uses. The circuit has the functionality of an AC-AC autotransformer and hence would be useful in, but not limited to, the following applications: a voltage controller for an AC motor; a voltage level shifter for 110 V loads; in balancing transmission line loads; for providing a variable AC voltage power supply; providing a soft-start circuit for loads with high startup currents; as an electronic tap-changer for transformers.

What is claimed is:

1. An alternating current power electronic converter comprising:
    an alternating current chopper circuit including two pairs of switches, each switch of a pair connected in series, and the two pairs of switches connected in parallel,
    wherein each switch of a pair is a uni-directional switch and wherein the uni-directional switches of each pair are arranged in opposing directions;
    wherein the uni-directional switches of one pair of switches are arranged in an opposing configuration to the uni-directional switches of the other pair of switches;
    wherein the circuit comprises a bridge connection between the two pairs of switches, the bridge connection being between the uni-directional switches of each pair; and
    wherein the alternating current power electronic converter further comprises a controller configured to control a sequence of operation of the switches, the sequence providing an overlap period whenever one of the uni-directional switches of a pair changes from open to closed and the other uni-directional switch of the pair changes from closed to open, and wherein during the overlap period the uni-directional switch that is moving from closed to open remains closed.

2. The alternating current power electronic converter according to claim 1, wherein each of the uni-directional switches includes a transistor and a diode, wherein the diodes of each pair are arranged in opposing directions, and wherein the diodes of one pair of switches are arranged in an opposing configuration to the diodes of the other pair of switches.

3. The alternating current power electronic converter according to claim 1, further comprising an inter-phase transformer comprising two inductors that is connected to each pair of switches, wherein the connection to each pair of switches is between the switches of each pair.

4. The alternating current power electronic converter according to claim 3, further comprising an LC filter, wherein the LC filter is connected to the inter-phase transformer and ground.

5. The alternating current power electronic converter according to claim 3, further comprising a voltage clamp arranged to clamp a voltage across the inductors of the inter-phase transformer on shut-down of the alternating current electronic power converter.

6. The alternating current power electronic converter according to claim 5, wherein the voltage clamp is an active clamp or a passive clamp.

7. The alternating current power electronic converter according to claim 6, wherein the controller is configured to operate the switches of the pairs to provide dead-time when opening and closing switches of different pairs of switches, and to overlap when opening and closing switches of a pair.

8. The alternating current power electronic converter according to claim 3, wherein the inductors are configured in: a cumulatively coupled series configuration; or a differentially coupled series configuration.

9. The alternating current power electronic converter according to claim 1, wherein the controller:
    is configured to control the sequence of operation of the uni-directional switches such that the sequence provides a dead-time when switching switches of different pairs of switches between open and closed statuses; or
    includes at least one of: a pulse width modulator; a dead-time generator or a sequence multiplexer; and includes at least one of: a voltage polarity detector; a voltage controller; a current controller; or a voltage and/or current controller.

10. The alternating current power electronic converter according to claim 9, wherein the controller includes the voltage polarity detector, and the voltage polarity detector is an opto-isolator.

11. A power distribution network comprising:
    a local substation having a high voltage input in the order of thousands of volts and a low voltage output in the order of hundreds of volts;
    electricity distribution cabling connected to the low voltage output of the local substation;
    at least one electricity consumer connected to the cabling, the at least one electricity consumer operating at an operating voltage that is less than the low voltage output of the substation; and
    the alternating current power electronic converter according to claim 1 situated between the electricity distribution cabling and the electricity consumer, wherein an input voltage to the alternating current power electronic converter is the low voltage output voltage of the local substation and an output voltage of the alternating current power electronic converter corresponds to the operating voltage of the at least one electricity consumer.

12. The power distribution network according to claim 11, wherein an input line/phase voltage of the high voltage input to the local substation is 11/6.35 kV+10/−6%.

13. The power distribution network according to claim 11, wherein an output line/phase voltage of the low voltage output of the local substation is 600/346 V.

14. A power distribution network according to claim 13, wherein the controller:
    is configured to control the sequence of operation of the uni-directional switches such that the sequence provides a dead-time when switching switches of different pairs of switches between open and closed statuses; or
    includes at least one of: a pulse width modulator; a dead-time generator or a sequence multiplexer; and includes at least one of: a voltage polarity detector; a voltage controller; a current controller, or a voltage and/or current controller.

15. A power distribution network according to claim 14, wherein the controller includes the voltage polarity detector, and the voltage polarity detector is an opto-isolator.

16. The power distribution network according to claim 11, wherein the output voltage of the alternating current power electronic converter is 230V+10%/−6%.

17. The power distribution network according to claim 11, wherein each of the uni-directional switches includes a transistor and a diode, wherein the diodes of each pair are arranged in opposing directions, and wherein the diodes of one pair of switches are arranged in an opposing configuration to the diodes of the other pair of switches.

18. The power distribution network according to claim 11, further comprising an inter-phase transformer comprising two inductors that is connected to each pair of switches, wherein the connection to each pair of switches is between the switches of each pair.

19. The power distribution network according to claim 18, further comprising an LC filter, wherein the LC filter is connected to the inter-phase transformer and ground.

20. The power distribution network according to claim 18, further comprising a voltage clamp arranged to clamp a voltage across the inductors of the inter-phase transformer on shut-down of the alternating current electronic power converter.

21. A power distribution network according to claim 20, wherein the voltage clamp is an active clamp or a passive clamp.

22. A power distribution network according to claim 18, wherein the inductors are configured in: a cumulatively coupled series configuration; or a differentially coupled series configuration.

* * * * *